United States Patent
Gentilhomme et al.

(10) Patent No.: US 12,026,646 B2
(45) Date of Patent: Jul. 2, 2024

(54) TITANIUM TASK-ENGINE SYSTEM

(71) Applicant: Nintex UK Ltd., London (GB)

(72) Inventors: Alain Marie Patrice Gentilhomme, Sammamish, WA (US); Ryan Christopher Duguid, Sammamish, WA (US); Adrian Rosario Francis Bezzina, Point Cook (AU); Zoe Dee Clelland, Seattle, WA (US)

(73) Assignee: Nintex UK Ltd., London (GB)

(*) Notice: Subject to any disclaimer, the term of this patent is extended or adjusted under 35 U.S.C. 154(b) by 0 days.

(21) Appl. No.: 18/232,622

(22) Filed: Aug. 10, 2023

(65) Prior Publication Data

US 2024/0119373 A1 Apr. 11, 2024

Related U.S. Application Data

(63) Continuation of application No. 17/751,542, filed on May 23, 2022, now Pat. No. 11,763,219, which is a continuation of application No. 16/664,587, filed on Oct. 25, 2019, now Pat. No. 11,367,027.

(60) Provisional application No. 62/750,734, filed on Oct. 25, 2018.

(51) Int. Cl.
  *G06Q 10/0631* (2023.01)
  *G06Q 10/0633* (2023.01)
  *G06Q 10/10* (2023.01)

(52) U.S. Cl.
  CPC ... *G06Q 10/06311* (2013.01); *G06Q 10/0633* (2013.01); *G06Q 10/10* (2013.01)

(58) Field of Classification Search
  CPC .......................................... G06Q 10/00–50/00
  USPC .................................................. 705/7.11–7.42
  See application file for complete search history.

(56) References Cited

U.S. PATENT DOCUMENTS

| | | | | |
|---|---|---|---|---|
| 9,811,363 B1 * | 11/2017 | Wagner | ................. | G06F 9/5033 |
| 9,811,434 B1 * | 11/2017 | Wagner | ............... | G06F 11/3006 |
| 10,282,229 B2 * | 5/2019 | Wagner | ................. | G06F 9/5038 |
| 10,303,492 B1 * | 5/2019 | Wagner | ................. | G06F 9/547 |
| 11,367,027 B2 | 6/2022 | Gentilhomme et al. | | |
| 11,763,219 B2 | 9/2023 | Gentilhomme et al. | | |

(Continued)

OTHER PUBLICATIONS

Madakam, Somayya, Rajesh M. Holmukhe, and Durgesh Kumar Jaiswal. "The future digital work force: robotic process automation (RPA)." JISTEM—Journal of Information Systems and Technology Management 16 (2019), 19 pages.

(Continued)

*Primary Examiner* — Alan S Miller
(74) *Attorney, Agent, or Firm* — Perkins Coie LLP

(57) ABSTRACT

The present disclosure is related to computing devices, systems, and methods for a new task-engine system that connects to a variety of task-interaction providers, enabling a user to use any one of multiple task-interaction providers to create and complete tasks within a workflow. That is, the connection to a variety of task-interaction providers allows a user to interact with the workflow through any of the task-interaction providers and create and/or complete any number of tasks in the workflow. The task-engine system may also update the creation and/or completion of a workflow task in all other task-interaction providers, such that all users may be aware of, or notified of, the current state of the workflow through any of the task-interaction providers.

20 Claims, 6 Drawing Sheets

(56) References Cited

U.S. PATENT DOCUMENTS

| | | | | |
|---|---|---|---|---|
| 2011/0179162 | A1* | 7/2011 | Mayo | G06F 9/5077 |
| | | | | 718/1 |
| 2012/0095585 | A1* | 4/2012 | Agarwal | G06Q 10/103 |
| | | | | 700/109 |
| 2012/0096463 | A1* | 4/2012 | Agarwal | G06Q 10/0633 |
| | | | | 718/100 |
| 2013/0339950 | A1* | 12/2013 | Ramarathinam | G06F 9/5077 |
| | | | | 718/1 |
| 2014/0040343 | A1* | 2/2014 | Nickolov | H04L 69/32 |
| | | | | 709/201 |
| 2014/0214478 | A1* | 7/2014 | Agarwal | G06Q 10/0633 |
| | | | | 705/7.27 |
| 2015/0356476 | A1* | 12/2015 | Agarwal | G06Q 10/06 |
| | | | | 705/7.27 |
| 2019/0303779 | A1* | 10/2019 | Van Briggle | G06F 9/485 |
| 2020/0004798 | A1* | 1/2020 | Weinert, Jr. | G06F 16/9577 |

OTHER PUBLICATIONS

Van der Aalst, Wil MP, Martin Bichler, and Armin Heinzl. "Robotic process automation." Business & Information Systems Engineering 60.4 (2018): 269-272.

* cited by examiner

TITANIUM TASK-ENGINE SYSTEM

CROSS-REFERENCE TO RELATED APPLICATION(S)

This application is a continuation of U.S. Non-Provisional application Ser. No. 17/751,542, filed on May 23, 2022 (U.S. Pat. No. 11,763,219) and titled "Titanium Task-Engine System," which is a continuation of U.S. Non-Provisional application Ser. No. 16/664,587, filed on Oct. 25, 2019 (U.S. Pat. No. 11,367,027), entitled "Titanium Task-Engine System," which claims priority to U.S. Provisional Application No. 62/750,734, filed on Oct. 25, 2018, entitled "Titanium Task-Engine System," the contents all of which are incorporated by reference herein as though set forth in their entirety and to which priority and benefit are claimed.

FIELD OF USE

The present disclosure relates generally to the field of network processes and tasks associated with them. More specifically, the present disclosure relates to systems, methods, and processes for the improved integration of, and enhanced communication with, task-interaction providers into network processes and arrangements.

Embodiments of this disclosure provide a system, method, and process that improves the efficient use of a computer system and its connection to and communication with other computer systems. Embodiments also include the collaborative development of systems that improve the interaction between various computer systems and improve the efficiency of all computer processes, the cloud, and the Internet in general. Specifically, embodiments of the disclosure provide a framework for task integration within various technologies such as workflow processes, workflow designers, and robotic process automation technology ("RPA"); thus improving communication between electronic devices and increasing the efficiency of the completion of tasks associated with the use of the electronic devices.

BACKGROUND

Workflows are applications and systems that streamline and automate a wide variety of processes—such as collecting signatures, gathering feedback, requesting approvals for a plan or document, or tracking the current status of a business procedure. Workflows can be created on low-code development platforms or via full-code implementations, enabling a user to automate many processes in a way that dramatically enhances productivity and efficiency in any industry.

One of the core components of a workflow are tasks. A task may be generally defined as a piece of work to be done or undertaken. Within workflows, a task may be further defined as electronic data that is to be completed by another system or human, either manually or automatically. A task may include options for completion or rejection, the ability to add additional details from the user, and capabilities for the escalation or delegation of tasks by one or more users.

Yet the present-day channels for users to interact with workflow tasks are very limiting. These channels do not allow the end user to work wherever they want to work, nor with just any desired systems, media or third party. Currently, user interaction with workflow tasks are restricted to the application or system that directly provides the workflow, communication via email, or a small number of mobile applications. This vastly limits the options that users have to communicate with the workflow, specifically limiting the ability and manner by which a user creates and complete tasks within the workflow.

The purpose of this disclosure is to extend the ways in which a user interacts with automated workflows and their associated tasks—allowing tasks to be easily distributed to a variety of systems, services or mediums, while maintaining task status and associated data in the core workflow system. This also applies to the interaction between RPAs and their corresponding tasks, wherein tasks are managed and/or created by RPAs.

The disclosure comprises a task-engine service that provides centralized management and routing of tasks; including processing, assignment, collection of supplemental data, governance, status, and syncing across all related systems. It may also provide application programming interfaces ("APIs") through which a user may connect to other task-interaction providers such as Skype, Slack, Salesforce, SharePoint, mobile, application, bots, emails, web forms, etc. The disclosed task-engine service may generate the user interface for each task-interaction provider, and when the user completes the task in one place, it will be automatically updated in all other places in which the task exists. In terms of how this is surfaced: the workflow administrator, by tenant, may configure globally which integrations can be used for tasks; the workflow designer, at a workflow level, may configure where tasks will be surfaced; and the end user may also configure its preferences to determine where tasks may be completed.

In a preferred embodiment, this disclosure provides a system, method, and computing device for receiving a call from an originating source—such as a workflow or an RPA—wherein the call comprises at least one task; determining a connection for a task-integration for the at least one task; connecting to the task-integration through the determined connection; sending the at least one task, through the connected task-integration, to at least one task-interaction provider; receiving a response from the at least one task-interaction provider, wherein the response comprises a response to the sent at least one task; configuring the response in accordance with the originating source; and delivering the workflow-configured response to the originating source. The task-integration may comprise an internal-task integration or an external-task integration: task integration that is internal to the computing device or a task integration that is external to the computing device. For example, the external-task integration may comprise email integration, which is using email functionality to send out tasks and receive responses for completion of the tasks. Additionally, the disclosure may further allow for identifying one or more other task-interaction providers in communication with the originating source; configuring the response from the at least one task-interaction provider in accordance with the identified other task-interaction providers; and delivering the configured response from the at least one task-interaction provider to the identified other task-interaction providers.

Thus, what is needed are systems, methods, and processes for systems that enable users to create, address, and resolve workflow tasks through various new means—which may be accomplished through improving the connection to and accessibility of workflows, and allowing for the enhanced integration of new and additional task-interaction providers beyond the current channels.

SUMMARY OF THE DISCLOSURE

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems, methods, and processes for a new task-engine system that may easily connect to a variety of task-interaction providers, enabling a user to create and complete tasks within a single workflow. The connection to a variety of task-interaction providers may allow a user to interact with a workflow through any of the task-interaction providers. The user may thus create and/or complete any number of tasks in the workflow through a selected task interaction provider. The task-engine system may also update the creation and/or completion of a workflow task in all other task-interaction providers, such that all users may be aware of, or notified of, the current state of the workflow through any of the task-interaction providers.

In one embodiment, the task-engine system may provide centralized features such as task processing, escalation, delegation, governance, and API to which task-interaction providers can be connected. In another embodiment, the task-engine system may support new and emerging technologies, previously unknown in the industry, to serve as task-interaction providers. The implementation of the task-engine system, together with the increased connection to new task-interaction providers, provides a major enhancement over existing workflow technologies. These advantages serve as improvements over existing workflow technology by increasing the power of the workflow through collaboration and sharing across various systems, platforms, and especially users.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

DETAILED DESCRIPTION OF EMBODIMENTS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

Figure 1:
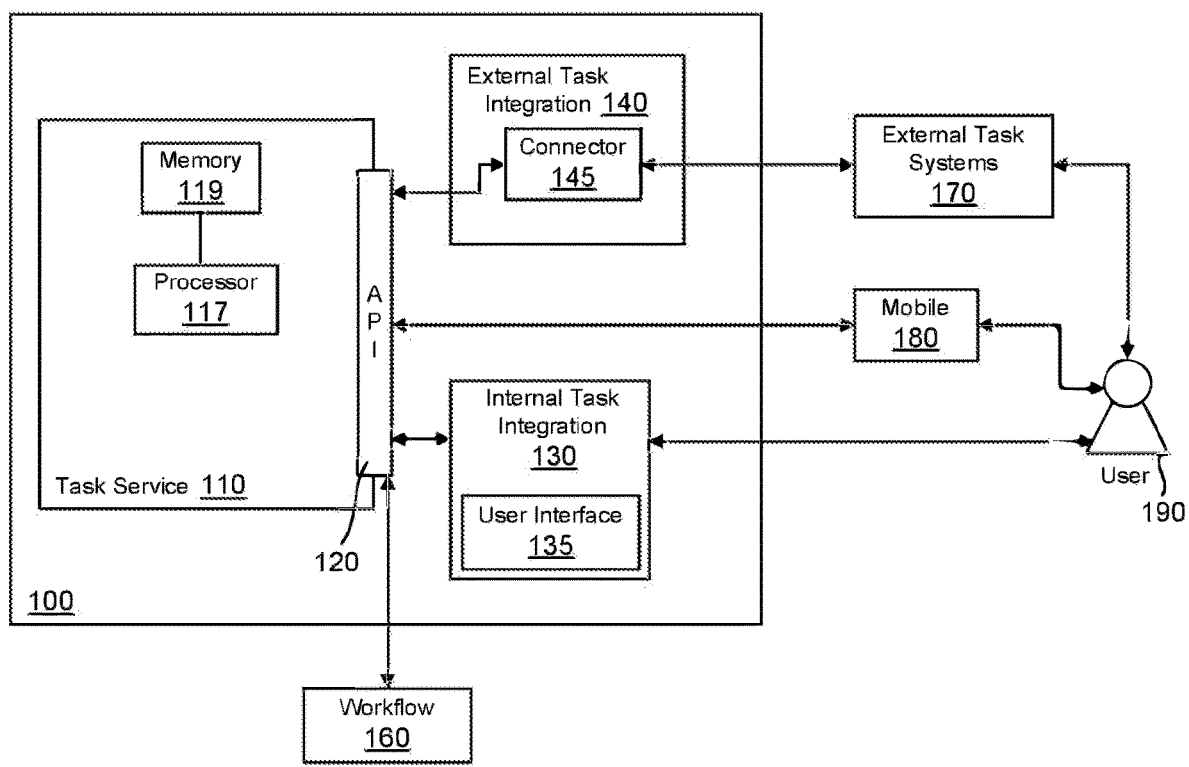
FIG. 1 is a functional block diagram generally illustrating an embodiment of the task-engine system for enabling communication between a workflow and at least one task provider.

FIG. 1 is a functional block diagram generally illustrating an embodiment of a task-engine system for enabling communication between a workflow and at least one task provider. However, the task-engine system is not limited to interactions between the task provider and a workflow. Rather, embodiments of the task-engine system also comprise interactions between the task provider and other systems, such as RPAs and workflow designers.

As shown in FIG. 1, the task-engine system 100 may comprise a task-service component 110, wherein the task-service component 110 may comprise a processor 117 and a memory 119. The task-engine system 100 may further comprise an API 120, an internal-task integration 130, and an external-task integration 140. The internal-task integration 130 may further comprise a user interface 135 and the external-task integration 140 may further comprise a connector 145.

A task may be defined as a piece of work to be done or undertaken, wherein a response to the task is required. A task in a workflow may comprise one or more steps to be completed, actions to be taken, or data to be gathered; all which may be done by one or more users. Programs, tools, or systems used to complete tasks within a workflow may be referred to as task-interaction providers. Tasks may be created or responded to by systems either external or internal to the task-engine system 100, via external-task integrations 140 or internal-task integrations 130 connections, respectively. Tasks may be considered an external task when the task is created or responded to via the external-task integration 140. A task may be considered an internal task when the task is created or responded to via the internal-task integration 130.

A user interface 135 may be implemented as an integration or an implementation, wherein the task will render on a mobile device 180 or other electronic devices used in connection with the workflow. A connector 145 may comprise a proxy for all communications to external-task systems 170, external software as a service (SaaS), and other third-party applications, systems, and services. Connectors 145 may interact with data or services, various cloud services, or any other data or services accessible through a network, including local area networks or wide area networks. A purpose of connectors 145 may be to receive data, responses, updates, and information related to tasks—internal and external—within a workflow. A connector 145 may further comprise the role of consuming files, events, and connections features, or eventing to keep changes in sync with SaaS tasks, such that task forms may have files attached to them.

The organization of tasks may comprise an ExternalEntity Concept, which is the concept that a set of tasks can belong to a related, external entity. The external entity may be a container that contains a set of tasks, such as where WorkFlowInstanceId is a candidate for an external entity. API operations for single instances of tasks may also work against sets of tasks. For example, cancelling a workflow should cancel all tasks related to that workflow via an ExternalEntityId, such that there should be a "cancel task" and "cancel tasks via ExternalEntityId." Syncing of tasks may be based on either internal or external metadata queries, and accomplished by assignee, custom attribute for a group of tasks, and other data elements. Syncing may further be accomplished by an email address of a user, by status or outcomes such as pending, completed, or overdue tasks, or by ExternalEntityId.

Notification, by the task-engine system 100, may comprise the action of notifying someone or something, wherein a response may or may not be required. A notification in a workflow 160 may be comprised of notifying one or more users of a task requiring to be completed, a completed task, or an updated task.

Delegation, by the task-engine system 100, may comprise a user sent, or authorized, to represent other users. Delegation in a workflow may be comprised of delegating tasks to other users or creating settings within the task-engine system 100, workflow 160, or external-task systems 170, wherein the settings relate to task-completion preferences of various entities such as an administrator, a designer, or a user.

Administrators may configure settings within the task-engine system 100 that determine which integrations may be used for tasks. Administrators may also define certification routes, as well as intersections within the certification routes, that make up the updating and completion of tasks. Administrators may also configure settings that establish a default setting for the completion of tasks. Configuration of settings may allow for tasks to be completed through the certification route if the route is supported or to go through pre-configured default settings. In other embodiments, an administrator may configure settings such that it allows a user to select and use a preferred method by which to complete tasks. In another embodiment, configuration of settings may allow for a user's preferred method to be used if there is an overlap of administrator settings and user preferred settings.

In other embodiments, designers may configure settings with the workflow 160, and users may configure settings or preferences for where they prefer to complete tasks. The purpose of delegation may be to enable users to set up delegation for their tasks. Examples of types of delegation include manager approval, out of office, bots, and contextual awareness (geolocation). In one embodiment, if a task is incorrectly assigned, rather than requiring users to be notified and/or canceling the workflow, the task may be delegated to the correct user. In another embodiment, tasks may be automatically delegated in situations where the tasks have not been completed by a user after a predetermined amount of time or tasks cannot be completed due to a user no longer having access to the workflow. In other embodiments, if a user is temporarily unavailable, tasks may be delegated to other users to ensure tasks are completed.

Escalation may comprise a task being made, or becoming, more intense or serious. Escalation in a workflow may comprise placing an emphasis or urgency on certain tasks, and may be accomplished via duration countdown, manager hierarchy, or designer experience. Escalation may be used on tasks that require a user action, such as when the user has not yet completed the task. It may automatically execute automation chains depending on conditions previously determined. A scheduler may check rules by default at fixed time intervals or at a fixed time. It may then execute the rules once or multiple times depending on parameters previously chosen. In some embodiments, if a task has not been completed by a set time, escalation may allow the task to be delegated to another user or to be completed automatically.

The task-engine system may require a user to only define the data that is needed for a workflow. The task providers may be predefined; with the task-engine system determining how best to interact with another user to get the required data and then updating the workflow once the data is obtained. The task-engine system may also preclude certain task providers based on the data required by the task and/or the actual user, as well as choosing a certain task provider based on data, calendar, or a person's location. This may allow the task-engine system to be more user-friendly because it may know the data needed and what remains to be completed.

In a preferred embodiment, communication between a workflow 160 and a task-interaction provider may be done via a task-engine system 100, wherein the processor 117 may be configured to receive a call from a workflow 160, wherein the received call may comprise at least one task to be completed within the workflow 160, wherein the processor 117 may determine a task-integration connection for the at least one task, connect to the task integration in configuration with the determined task-integration connection, send the at least one task through the connected task integration to the at least one task-integration provider, receive a response from the at least one task-integration provider, wherein the response comprises a response to the sent at least one task, configure the response from the at least one task-integration provider in accordance with the workflow 160, and deliver the configured response from the at least one task-integration provider to the workflow 160. The task-engine system 100 may update or notify other task-integration providers by determining the identity of other task-integration providers in communication with the workflow, configuring the response from the at least one task-integration provider in accordance with the identified other task-integration providers, and delivering the configured response from the at least one task-integration provider to the identified other task-integration providers. In other embodiments, the task-engine system 100 will automatically generate the user interface 135 for each task-interaction provider and when a user completes the task in one place, it would automatically be completed in all other providers.

In a separate embodiment, an RPA may replace the workflow 160 in FIG. 1. That is, communication between an RPA and a task provider may be done via a task-engine system 100, wherein the processor 117 may be configured to receive a call from the RPA, wherein the received call may comprise at least one task to be completed within the RPA, wherein the processor 117 may determine a task-integration connection for the at least one task, connect to the task integration in configuration with the determined task-integration connection, send the at least one task through the connected task integration to the at least one task-interaction provider, receive a response from the at least one task-interaction provider, wherein the response comprises a response to the sent at least one task, configure the response from the at least one task-interaction provider in accordance with the RPA, and deliver the configured response from the at least one task-interaction provider to the RPA. The task-engine system 100 may update or notify other task-interaction providers by determining the identity of other task-interaction providers in communication with the RPA, configuring the response from the at least one task-interaction provider in accordance with the identified other task-interaction providers, and delivering the configured response from the at least one task-interaction provider to the identified other task-interaction providers.

In another embodiment, the task integration comprises an internal-task integration 130, wherein the internal-task integration 130 comprises at least one user interface 135, and wherein the at least one task provider comprises the at least one user interface 135.

Another embodiment may comprise of a custom JavaScript for the user interface 135 when required in an action configuration panel if the default components do not meet the user interface requirements. Widget architecture may be required for embeddable user interface components such as Settings Pages, Administration Screens, and Task forms.

In one embodiment, the task integration comprises an external-task integration 140, wherein the external-task integration 140 comprises at least one connector 145 and wherein the at least one task provider comprises external task systems 170. Embodiments of external-task systems 170 may be Skype, Slack, bots, voicemail, SMS, email, SharePoint, Salesforce, web forms, and mobile forms.

In another embodiment, the task-engine system 100 may receive a call from the workflow 160 or an RPA or workflow designer, wherein the call comprises at least one task, connection to at least one external-task integration 140, and connection to the at least one internal-task integration 130, connecting to the at least one external-task integration 140, connecting to the at least one internal-task integration 130, sending the at least one task through the external-task integration 140 to the at least one task provider 130, creating an instance of the at least one task in at least one task provider, and creating a proxy instance of the at least one task in the at least one internal-task integration 130.

The task-engine system 100 may further comprise receiving a response from the at least one task provider, wherein the response comprises a response to the sent at least one task, configuring the response from the at least one task provider to update the proxy instance of the at least one task in the at least one task provider, updating the proxy instance of the at least one task in the at least one task provider, configuring the response from the at least one task provider in accordance with the workflow, and delivering the configured response from the at least one task provider to the workflow.

The task-engine system 100 may further comprise receiving a response from the user interface 135, wherein the response comprises a response to the sent at least one task, configuring the response from the user interface 135 to update the instance of the at least one task in the at least one task provider, updating the instance of the at least one task in the at least one task provider, configuring the response from the user interface 135 in accordance with the workflow, and delivering the configured response from the user interface 135 to the workflow 160.

Figure 2:
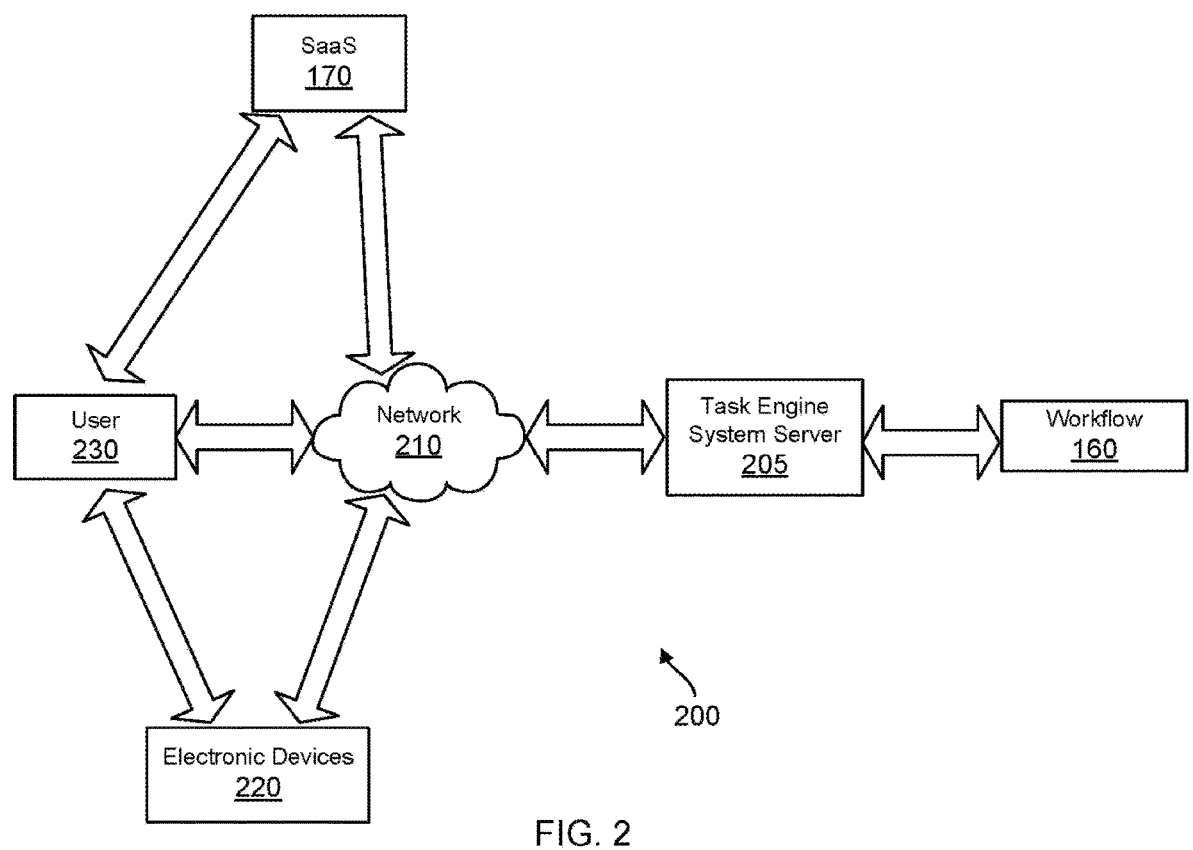
FIG. 2 is a functional block diagram generally illustrating an embodiment of a network system of a task-engine system.

FIG. 2 is a functional block diagram generally illustrating an embodiment of a network system of a task-engine system 200. Shown in FIG. 2 is a task-engine system server 205 accessible over a local area networks or a wide area network 210, such as the Internet, by one or more user computing devices 220, by users 230 through the user interface 135, and external task systems 170. As illustrated, the task-engine system server 205 hosts one or more workflows 160 each accessible to their respective owners and other users. In accordance with the preferred embodiment, the task-engine system server 205 is remotely accessible by a number of user computing devices 220, including for example, laptops, smartphones, computers, tablets, and other computing devices that are able to access the local area network or a wide area network where the task-engine system server 205 resides.

In normal operation, each user computing device 220, user 230, or external task system, such as a SaaS 170, connects with the task-engine system server 205 to interact with a workflow 160. In one example, an email connector may be used to send a pre-defined email as part of a workflow. In another example, a CRM connector may be used to sync to a customer relationship management cloud service that hosts important data for the customer. Syncing may occur via a mechanism by which a task is pulled or by pushing a task into the system. These and many other examples will be apparent to those skilled in the art. For the purpose of this discussion, each user computing device 220 may take the form of computer software and hardware deployed in a local computing environment or perhaps in a remote hosted computing environment. Each user computing device 220 may host or access its own workflows, perhaps executing on the user's own premises. However, in accordance with the most preferred embodiment, a number of user computing devices 220 may interact with the task-engine system server 205 to manage the user workflows remotely hosted at the task-engine system server 205. The features enabled by the interaction of user computing devices 220 and the task-engine system server 205 include, but are not limited to, the ability to create and complete tasks in workflows among a plurality of users and the ability to externally execute one or more tasks in shared workflows.

Figure 3:
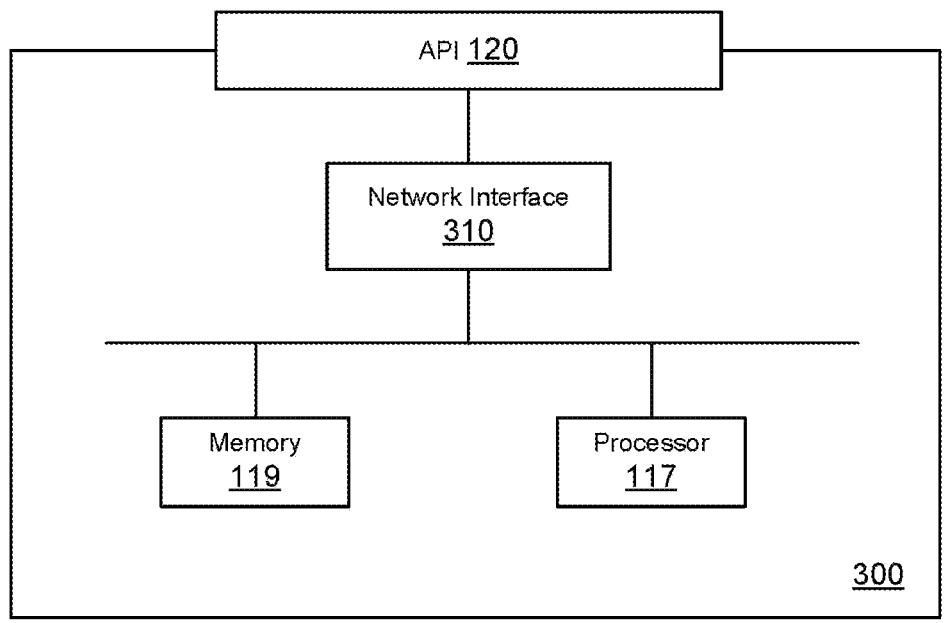
FIG. 3 is a functional block diagram generally illustrating an embodiment of an electronic task engine of a task-engine system.

FIG. 3 is a functional block diagram generally illustrating an embodiment of an electronic task service 300 of a task engine service system. The electronic task service 300 may generally comprise a processor 117, a memory 119, an API 120, and a network interface 310. The electronic task device 300 is not limited to any particular configuration or system.

Figure 4:
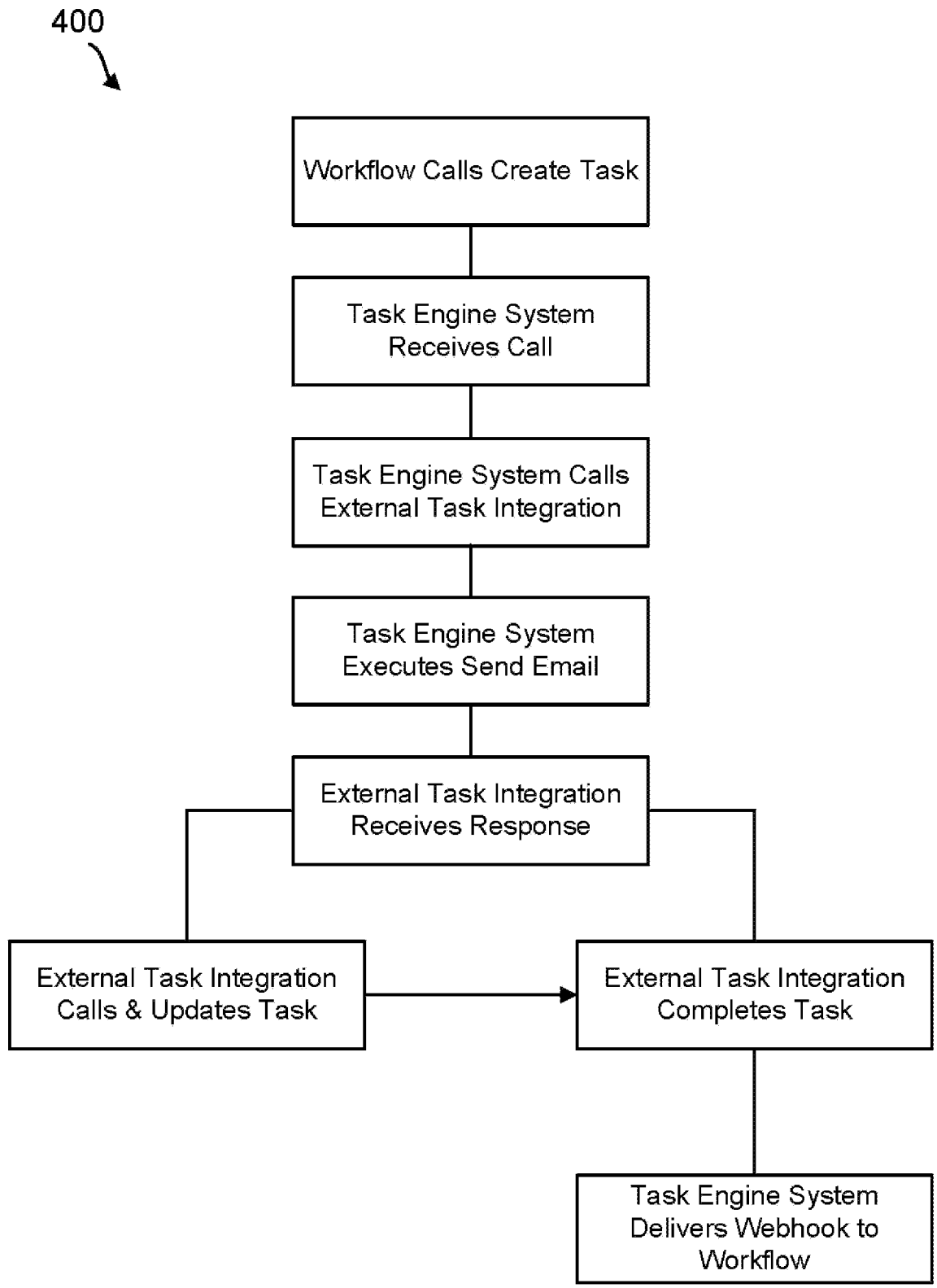
FIG. 4 is a functional flow diagram generally illustrating an embodiment of an Express Approval task creation using a task-engine system.

FIG. 4 is a functional flow diagram generally illustrating an embodiment for the creation 400 of an Express Approval task using a task-engine system. An embodiment of an Express Approval task enables the approval or rejection of an item, such as a task, to be carried out and registered when a user replies to a notification email or chatbot conversation with a pre-determined word or phrase that was configured at design time. The pre-determined words and/or phrases are recognized and interpreted by the task-engine system and are applied to the item or task in the workflow. For example, the workflow calls Create Task in the task-engine system via the API. Upon receiving the call, the task-engine system calls Express Approval integration and executes Send Email (which sends an email containing necessary data for response). If responded to, the Express Approval integration receives the response, calls the task-engine system's Update Task or Complete Task API, and the task-engine system delivers a webhook back to the workflow to update the workflow with the response. In other embodiments, tasks may be sent to and updated from, other systems that are distinguishable from email correspondence or chatbots.

Figure 5:
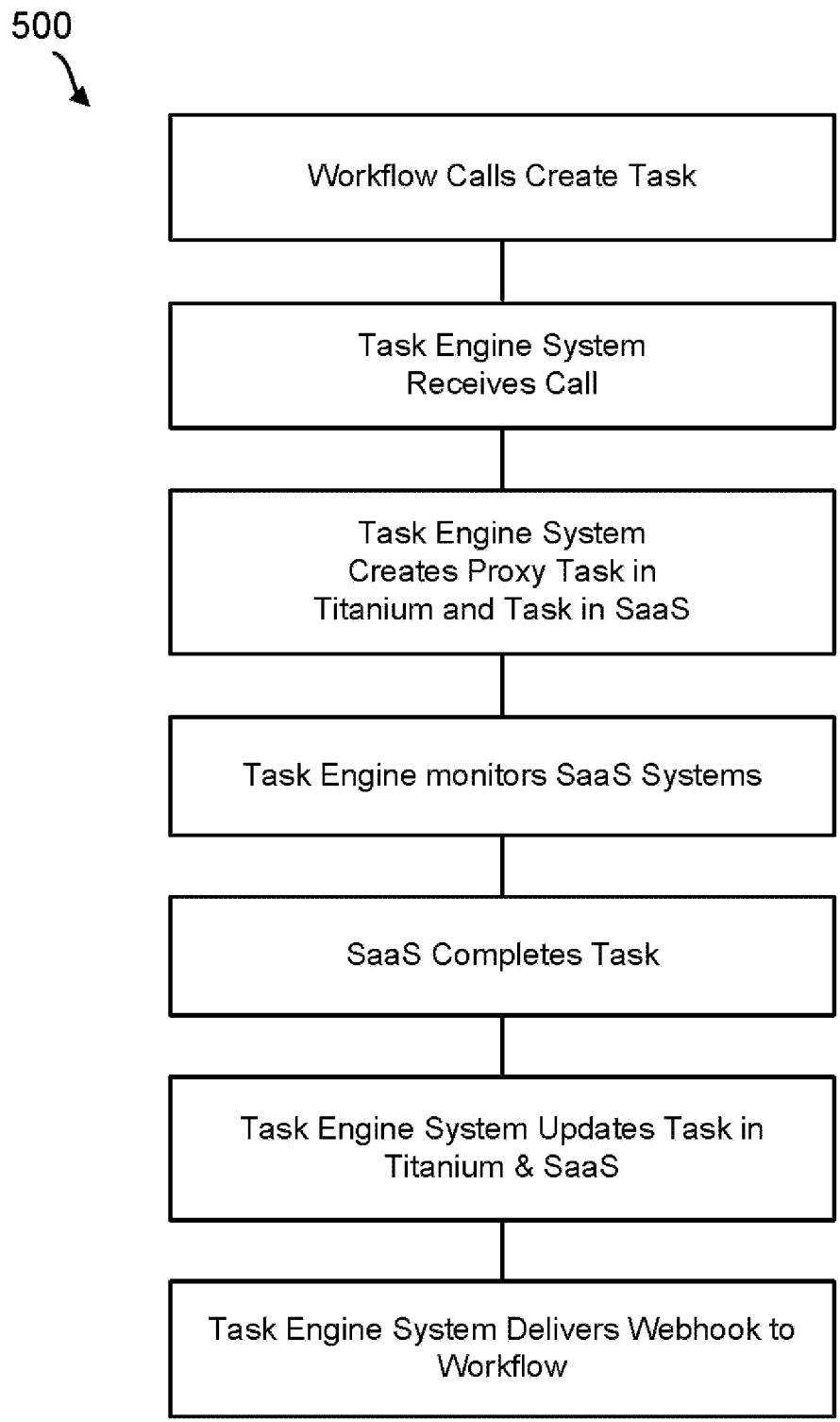
FIG. 5 is a functional flow diagram generally illustrating an embodiment of a User Interface task creation using a task-engine system.

FIG. 5 is a functional flow diagram generally illustrating an embodiment of User Interface task creation 500 using a task-engine system. In one embodiment, the designer may configure a SaaS to be a task system. The workflow calls Create Task in the task-engine system via the API, specifying the SaaS integration. The task-engine system creates a proxy instance of the task in the task-engine system and creates a task in the SaaS and monitors its changes. The task-engine system then may update in either the SaaS or the task-engine system, and an update is synchronized in both. The task-engine system then delivers a webhook back to the workflow on response.

Figure 6:
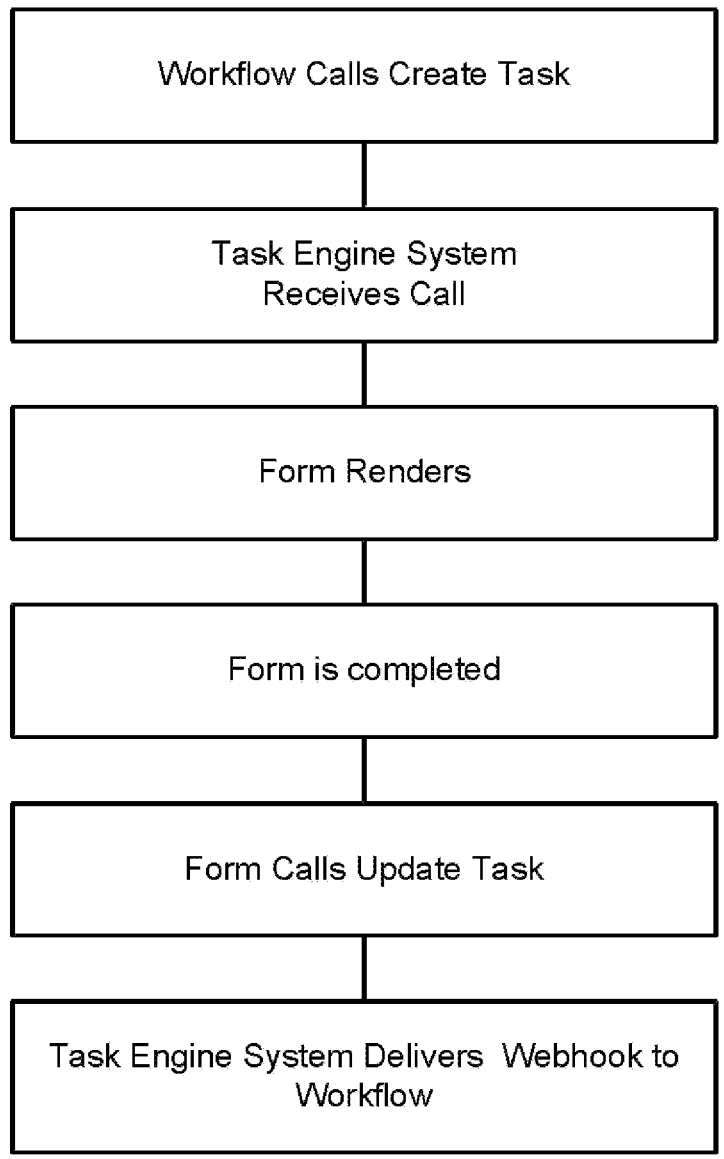
FIG. 6 is a functional flow diagram generally illustrating an embodiment of an Express Approval task creation using a task-engine system.

FIG. 6 is a functional flow diagram generally illustrating an embodiment of an Express Approval task creation 600 using a task-engine system. In one embodiment, the designer creates a form in an implementation within the internal-task integration and associates it with a task action. The workflow calls Create Task in the task-engine system via the API. No integration is specified as the implementation is the user interface for the task-engine system. A payload contains all task information, plus additional metadata including a pointer to the task form to render for the task. Upon the task-engine system receiving the call, the form renders using a standard implementation form with the task-engine system as a data source. The form is completed and calls the Update Task API in the task-engine system. The task-engine system delivers a webhook back to the workflow on response.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A method of enabling communication with task-interaction providers, the method comprising:
    accessing, by a computing device, at least one task;
    determining, by the computing device, a connector for the at least one task,
        wherein the connector comprises a proxy for communicating with a first task-interaction provider;
    transmitting, by the computing device, the at least one task via the determined connector to the first task-interaction provider;
    receiving, by the computing device, a response from the first task-interaction provider;
    identifying a second task-interaction provider different from the first task-interaction provider;
    configuring the response from the first task-interaction provider in accordance with the second task-interaction provider; and
    transmitting the configured response to the second task-interaction provider.

2. The method of claim 1, wherein the first task-interaction provider, the second task-interaction provider, or both are external to the computing device.

3. The method of claim 1, wherein the first task-interaction provider, the second task-interaction provider, or both are internal to the computing device.

4. The method of claim 1, further comprising:
    configuring, by the computing device, the response from the first task-interaction provider,
        wherein the at least one task is received from an originating source; and
    delivering, by the computing device, the configured response to the originating source.

5. The method of claim 4, wherein the task originating source comprises at least one of a workflow, an RPA, a workflow designer, or combinations thereof.

6. The method of claim 1, further comprising:
    automatically generating a user interface for the first task-interaction provider, the second task-interaction provider, or both.

7. The method of claim 1, further comprising:
    identifying a set of task-interaction providers in communication with the computing device,
        wherein upon completion of the at least one task at the first task-interaction provider, a status of the at least one task is automatically updated as being complete at the second task-interaction provider and each of the set of task-interaction providers.

8. The method of claim 1, further comprising:
    identifying a set of task-interaction providers in communication with the computing device,
    configuring the response from the first task-interaction provider in accordance with each of the set of task-interaction providers; and
    transmitting the respective configured response to each of the respective set of task-interaction providers.

9. The method of claim 1, wherein the task is associated with a workflow.

10. The method of claim 1, wherein the task is associated with a workflow, wherein the workflow is associated with multiple tasks, and wherein each of the multiple tasks can be performed by one or more entities.

11. At least one non-transitory, computer-readable medium carrying instructions, which when executed by at least one data processor, performs operations for enabling communication with task-interaction providers, the operations comprising:
    accessing, by a computing device, at least one task;
    determining, by the computing device, a connector for the at least one task,
        wherein the connector comprises a proxy for communicating with a first task-interaction provider;
    transmitting, by the computing device, the at least one task via the determined connector to the first task-interaction provider;
    receiving, by the computing device, a response from the first task-interaction provider;
    identifying a second task-interaction provider different from the first task-interaction provider;
    configuring the response from the first task-interaction provider in accordance with the second task-interaction provider; and
    transmitting the configured response to the second task-interaction provider.

12. The at least one non-transitory, computer-readable medium of claim 11, wherein the first task-interaction provider, the second task-interaction provider, or both are external to the computing device.

13. The at least one non-transitory, computer-readable medium of claim 11, wherein the first task-interaction provider, the second task-interaction provider, or both are internal to the computing device.

14. The at least one non-transitory, computer-readable medium of claim 11, wherein the operations further comprise:
    configuring, by the computing device, the response from the first task-interaction provider,
        wherein the at least one task is received from an originating source; and
    delivering, by the computing device, the configured response to the originating source.

15. The at least one non-transitory, computer-readable medium of claim 14, wherein the task originating source comprises at least one of a workflow, an RPA, a workflow designer, and combinations thereof.

16. The at least one non-transitory, computer-readable medium of claim 11, wherein the operations further comprise:
    automatically generating a user interface for the first task-interaction provider, the second task-interaction provider, or both.

17. The at least one non-transitory, computer-readable medium of claim 11, wherein the operations further comprise:

identifying a set of task-interaction providers in communication with the computing device,
wherein upon completion of the at least one task at the first task-interaction provider, a status of the at least one task is automatically updated as being complete at the second task-interaction provider and each of the set of task-interaction providers.

18. The at least one non-transitory, computer-readable medium of claim 11, wherein the operations further comprise:
identifying a set of task-interaction providers in communication with the computing device,
configuring the response from the first task-interaction provider in accordance with each of the set of task-interaction providers; and
transmitting the respective configured response to each of the respective set of task-interaction providers.

19. The at least one non-transitory, computer-readable medium of claim 11, wherein the task is associated with a workflow.

20. A method of enabling communication with task-interaction providers, the method comprising:
receiving, by a computing device, at least one task;
determining, by the computing device, an external connector for the at least one task,
wherein the external connector comprises a proxy for communicating with a first task-interaction provider external to the computing device;
connecting to the first task-interaction provider through the determined external connector;
connecting to a second task-interaction provider internal to the computing device;
transmitting, by the computing device, the at least one task via the determined external connector to the first task-interaction provider;
creating a proxy instance of the at least one task in the second task-interaction provider internal to the computing device; and
receiving, by the computing device, a response from the first task-interaction provider, the second task-interaction provider, or both.

* * * * *